| United States Patent [19] | [11] 4,100,681 |
|---|---|
| Hollander | [45] Jul. 18, 1978 |

[54] PICTURE FRAME LEVELING DEVICE

[76] Inventor: Bruce L. Hollander, 1025 Tyler St., Hollywood, Fla. 33020

[21] Appl. No.: 739,603

[22] Filed: Nov. 8, 1976

[51] Int. Cl.² .......................... B32B 3/00; B65D 65/28
[52] U.S. Cl. ........................................ 33/389; 33/347;
33/381; 33/390; 206/484; 428/35; 428/40;
428/43; 428/166; 428/172; 428/178; 428/307
[58] Field of Search .................... 428/43, 166, 172, 40,
428/307, 178, 35; 33/347, 379, 388, 389, 381,
390; 206/813, 459, 461, 484, 205

[56] References Cited

U.S. PATENT DOCUMENTS

| 2,813,349 | 11/1957 | Harris | 33/379 |
| 2,877,555 | 3/1959 | Visockis, Jr. | 33/290 |
| 3,269,729 | 8/1966 | Morrison | 33/389 |
| 3,630,346 | 12/1971 | Burnside | 206/461 |
| 3,944,692 | 3/1976 | Swenson | 428/40 |

Primary Examiner—George F. Lesmes
Assistant Examiner—P. J. Thibodean
Attorney, Agent, or Firm—Ernest H. Schmidt

[57] ABSTRACT

An inexpensive spirit level having means for easy attachment to upper surface portions of picture frames or the like. The device comprises a transparent tape having blister-like cavities at regular intervals, a base tape affixed in face-to-face relation against one side of the transparent tape and having a pressure sensitive adhesive on the outside for attachment to a surface portion of a frame, and a liquid partially filling said cavities. Eash blister cavity has a bubble corresponding to the unfilled space which bubbles will move along the curvature of the blister, thereby indicating the relative position of the device with respect to a horizontal plane. Suitable markings on the transparent tape are provided to facilitate reading level position with respect to the horizontal plane.

3 Claims, 5 Drawing Figures

PICTURE FRAME LEVELING DEVICE

This invention relates to spirit levels and is directed particularly to a simple and inexpensive spirit level for permanent attachment to the top of a rectangular picture frame to assist in the straight hanging thereof.

Various spirit level devices for positioning structures and apparatus relative to a horizontal plane have heretofore been devised. Such spirit level devices as are known, however, are deficient in various respects, principally because of their complexity, size and cost. It is, accordingly, the principal object of this invention to provide a simple, inconspicuous and inexpensive spirit level device that may be left attached to the top of a rectangular picture frame to facilitate precise vertical hanging.

A more particular object of the invention is to provide a spirit level device which, upon its attachment to a picture frame, will be small enough not to disturb the aesthetic value of the framed picture.

Yet another object of the invention is to provide a spirit level device of the above nature and so constructed in strips of connected units as to be sufficiently flexible enough to permit high density packaging in roll form.

Other objects, features and advantages of the invention will be apparent from the following description when read with reference to the accompanying drawings. In the drawings, wherein like reference numerals denote corresponding parts throughout the several views.

Figure 1:
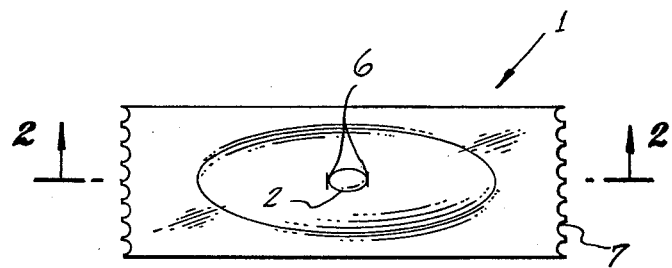
FIG. 1 is a top view of the picture frame leveling device embodying the invention.

Referring now in detail to the drawings, reference numeral 1 designates, generally, a spirit level device embodying the invention which comprises, generally, a flexible base tape 3 and a transparent blister tape 4, said base tape being longitudinally affixed against one side of said transparent blister tape so as to enclose the blister shaped longitudinal cavities formed therein to define closed chambers. The chambers are almost filled with a liquid 5 of suitable viscosity, the remaining space creating a bubble 2, preferably of air, but which may be of other fluid not soluble in said liquid. Transverse markings 6—6 on the transparent blister tape 4 provide a ready reference for determining position with respect to the horizontal plane.

The base tape 3 is provided on the outside with a pressure-sensitive adhesive coating 8 for affixing along the top of a framed picture. The coating 8 is covered with a protective paper tape 9 that is peeled off when the device is ready to be affixed to the frame.

Whereas FIG. 1 shows transparent blister tape 4 being of somewhat smaller width than the base tape 3, this is not critical to the invention and selection of the relative width will depend upon the requirements of the manufacturing process whereby good sealing of the blister cavity is achieved. As further illustrated in FIG. 1 transverse perforations 7 are provided at regular intervals along the tape assembly to permit the easy separation of individual level units for use.

Figure 2:
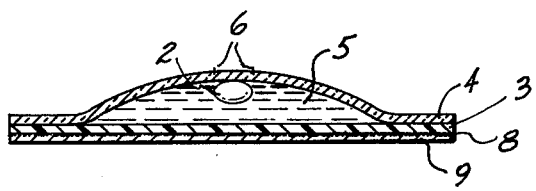
FIG. 2 is a longitudinal cross-section taken along the line 2—2 of FIG. 1 in the direction of the arrows.

Referring now to FIG. 2, which shows a cross-section of the invention, it may be observed that when the device is placed upon the surface for which levelness is to be determined, the bubble 2, due to its inherent nature, will always appear at the uppermost portion of the curved blister and will fall either to the left or to the right of markings 6—6, thereby indicating the higher side of the picture frame. The frame will be leveled when the bubble 2 comes to rest centrally between the markings 6—6.

Figure 3:
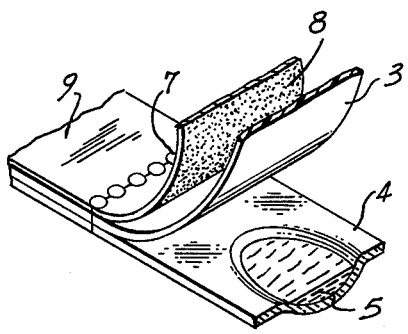
FIG. 3 is a partially disassembled view, in perspective, of the leveling device.
Figure 4:
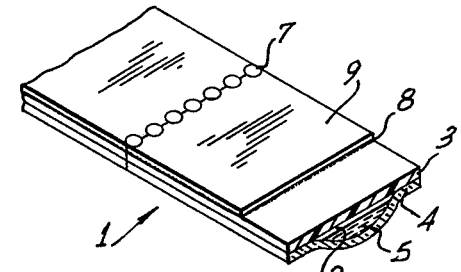
FIG. 4 is a transverse cross-sectioned view, in perspective, of the leveling device, illustrating constructional details.

As illustrated in FIG. 3 the above described composite tape level can conveniently be manufactured by placing the transparent blister tape 4 upsidedown in a suitable jig or supporting structure maintaining it in horizontal position, then filling the blister cavities with the required amount of liquid 5, and finally applying the base plate 3 from above in a progressive fashion from one end to the other so that complete sealing is effected between the tapes. It will be understood that just enough liquid 5 will be deposited in each of the cavities of the transparent blister tape 4 to leave a suitably sized air bubble remaining in the chambers defined between the interassembled tapes. The face-to-face securment of transparent tape 4 to the base tape 3 will preferably be effected by heat sealing, it being understood that said tapes will be of such materials as to be compatible with the process.

Figure 5:
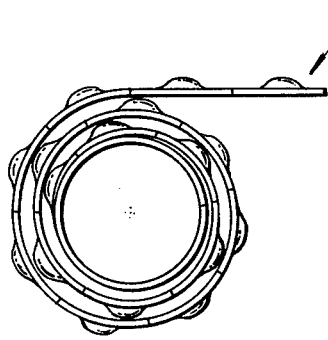
FIG. 5 shows a roll containing a plurality of the leveling devices.

Before separation along the transverse perforations 7, of individual ones of the level units for use, the tape assembly can be supplied as a continuous roll as illustrated in FIG. 5. In this connection it will be understood that the transparent blister tape 4 and the base tape 3 will be of flexible enough materials to permit such packaging in rolls.

While I have illustrated and described herein only one form in which my invention can conveniently be embodied in practice, it is to be understood that this embodiment is presented by way of example only and not in a limiting sense. The invention, in brief, comprises all the embodiments and modifications coming within the scope and spirit of the followig claims.

That I claim as new and desire to secure by Letters Patent is:

1. A spirit level device comrising:
   a. a flexible base member;
   b. a flexible transparent blister member having a longitudinal cavity of blister-like shape;
   c. adhesive means affixing said blister member in face-to-face engagement against one side of said base member to define therewith a closed cavity chamber;
   d. a liquid filling most of said chamber;
   e. a bubble filling the remainder of said chamber not filled by said liquid;
   f. means on said blister member for indicating the leveling position of said bubble in said cavity chamber;
   g. a coating of pressure sensitive adhesive on the outside of said base member; and
   h. a protective cover strip covering said pressure-sensitive adhesive on the outside of said base member;
   i. said blister member being formed with a plurality of longitudinal cavities equidistantly spaced therealong, said base member being substantially coextensive with said blister member, each of the closed cavity chambers thereby defined being filled with liquid and an air bubble.

2. A spirit level device as defined in claim 1 including transverse zones of weakness between adjacent ones of said cavities to facilitate separation of individual ones of spirit level devices for use.

3. A spirit level device as defined in claim 2, wherein said base member and said transparent blister member are sufficiently flexible to permit rolling together thereof for compact merchandising.

* * * * *